US007861457B2

(12) United States Patent
Blette et al.

(10) Patent No.: US 7,861,457 B2
(45) Date of Patent: Jan. 4, 2011

(54) REUSABLE LINE CONNECTOR

(75) Inventors: Russell E. Blette, Hastings, MN (US); John E. Stark, Maplewood, MN (US); Jameel R. Qiblawi, North Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1133 days.

(21) Appl. No.: 10/941,284

(22) Filed: Sep. 15, 2004

(65) Prior Publication Data

US 2005/0039376 A1 Feb. 24, 2005

(51) Int. Cl.
*A01K 91/047* (2006.01)

(52) U.S. Cl. ......................... 43/44.9; 43/43.1; 403/300; 403/306; 403/343; 24/128

(58) Field of Classification Search ................. 43/43.1, 43/44.83, 44.9, 44.93; 403/52, 60, 275, 300, 403/306, 343; 24/128, 135 R, 136 R, 136 B
See application file for complete search history.

(56) References Cited

U.S. PATENT DOCUMENTS 1,347,515 A 7/1920 Lutz
1,762,572 A * 6/1930 Davidson .................... 403/343
2,183,791 A * 12/1939 Dunn .......................... 66/117
2,465,064 A 3/1949 Colosimo
2,552,248 A * 5/1951 Zavod ........................ 403/182
2,838,821 A 6/1958 Shur
2,955,379 A 10/1960 Hull
3,041,695 A 7/1962 Ouellette
3,091,885 A 6/1963 Ulsh
3,140,520 A 7/1964 Marino et al.
3,148,423 A 9/1964 Anspach
3,416,200 A 12/1968 Daddona, Jr.
3,518,784 A * 7/1970 Moss et al. ................ 43/43.12
3,551,963 A 1/1971 Mosher, Jr. et al.
3,717,907 A 2/1973 Klein
3,722,130 A 3/1973 Handl
3,734,551 A 5/1973 Hughes et al.
3,834,061 A 9/1974 Klein
3,857,645 A 12/1974 Klein
3,988,852 A 11/1976 Klein
4,060,926 A 12/1977 Cordell, Jr.

(Continued)

FOREIGN PATENT DOCUMENTS

FR 2 441 572 6/1980

(Continued)

*Primary Examiner*—Darren W Ark
(74) *Attorney, Agent, or Firm*—Lisa P. Fulton

(57) ABSTRACT

A splice system for linear connection of fishing lines includes a female connector and a male connector. Each connector has first and second opposite ends, a longitudinal axis, and a shaped exterior surface. The first end of the female connector is connected to a first fishing line section; the second end has a first opening; and the connector has a raised interior feature. The second end of the male connector is connected to a second fishing line section; the first end is configured for coaxial insertion into the first opening of the female connector, and the first end has a raised exterior feature. The connectors have a first relative position representing a disengaged state and a second relative position representing an engaged state. The first relative position and the second relative position are rotationally displaced about the axis.

20 Claims, 9 Drawing Sheets

U.S. PATENT DOCUMENTS

| | | | | |
|---|---|---|---|---|
| 4,117,574 | A | | 10/1978 | Yoshida |
| 4,125,958 | A | | 11/1978 | Côté |
| 4,194,273 | A | | 3/1980 | Williams |
| 4,205,478 | A | | 6/1980 | Emory |
| 4,210,984 | A | | 7/1980 | Koenig |
| 4,369,551 | A | | 1/1983 | Heredia |
| 4,848,018 | A | | 7/1989 | Clarke |
| 5,143,500 | A | | 9/1992 | Schuring et al. |
| 5,157,861 | A | | 10/1992 | Peterson |
| 5,240,295 | A | | 8/1993 | Spencer |
| 5,301,454 | A | | 4/1994 | Chen |
| 5,469,606 | A | | 11/1995 | Hansen |
| 5,469,652 | A | | 11/1995 | Drosdak |
| 5,647,103 | A | * | 7/1997 | Foster ......................... 24/618 |
| 5,971,447 | A | | 10/1999 | Steck, III |
| 2002/0139038 | A1 | | 10/2002 | Frisco |

FOREIGN PATENT DOCUMENTS

| | | |
|---|---|---|
| FR | 2 578 150 | 9/1986 |
| JP | 04104751 | 4/1992 |
| JP | 04346737 | 12/1992 |
| JP | 09313080 | 12/1997 |
| JP | 2000312550 | 11/2000 |
| JP | 2000316439 | 11/2000 |
| WO | WO 97/05775 | 2/1997 |

* cited by examiner

REUSABLE LINE CONNECTOR

CROSS-REFERENCE TO RELATED APPLICATION(S)

This application incorporates by reference and claims priority from application Ser. No. 10/628,220, filed Jul. 28, 2003, entitled "Line Splice Using Barb and Receiver," by Russell E. Blette, John E. Stark and Jeffrey L. Wieringa.

BACKGROUND OF THE INVENTION

This invention relates in general to a device and method for linearly connecting strand materials and more particularly to a device which facilitates the connection of fishing lines.

In many types of fishing, and particularly in fly fishing, it is necessary or desirable to linearly connect sections of fishing line, either because of different properties of the sections or to repair a break. A fly fisherman must be equipped with a fishing rod, a fishing line called a fly line, a device such as a reel to hold the fly line, a leader line commonly called a leader, and flies. A leader is a relatively short, fine, tapered segment of monofilament line, with its larger or butt end attached to the fly line and its smaller or terminal end to the fly.

Fly fishing involves casting a line a substantial distance over a body of water wherein only the weight of the line is used to effect the cast. A skilled fly caster typically uses a tapered line and a tapered leader at the end of this line. One of the more difficult aspects of fly fishing involves connecting the end of the leader to the end of the fishing line by tying a knot. The knot must be specially selected to avoid kinks and/or slip-separation of the leader from the line.

Typically, a leader will range from as short as 5 or 6 feet to as long as 12 to 15 feet. Some leaders possess a true taper, that is, they undergo a gradual change in diameter from the butt end to the terminal end without any interruptions in the leader material. Other leaders consist of lengths of varying diameter leader material tied together. Many fishermen favor the latter, that is the knotted leader, in that it enables them to tailor the leader to their own needs. But irrespective of whether the fisherman uses a truly tapered leader or a knotted leader, the fisherman will usually find it necessary to replace the end section or segment of the leader, often called the tippet, for this is where the leader is thinnest and weakest, and where it will break if its capacity is exceeded. Tippet replacement and repair usually require a fisherman to form a knot. Moreover, when a fisherman changes to a smaller fly, a thinner tippet is often required. Hence, the typical fisherman must tie knots from time to time in leader material, which is usually monofilament line.

The knots which join the lengths of leader material either to the fly line or to other leader sections must accommodate the varying diameters of material and must be strong. Nail knots and Albright knots meet these requirement, but are time consuming to tie and require skill, good eyesight and considerable manual dexterity. Moreover, the knot is usually the weakest part of the fish line and may cause the breaking of the fish line at the knot.

Thus, there remains a need for a quick and easy device and method for strong linear connection of fishing lines.

BRIEF SUMMARY OF THE INVENTION

A splice system for linear connection of fishing lines includes a female connector and a male connector. Each connector has first and second opposite ends, a longitudinal axis, and a shaped exterior surface. The first end of the female connector is connected to a first fishing line section; the second end has a first opening; and the connector has a raised interior feature. The second end of the male connector is connected to a second fishing line section; the first end is configured for coaxial insertion into the first opening of the female connector, and the first end has a raised exterior feature. The connectors have a first relative position representing a disengaged state and a second relative position representing an engaged state. The first relative position and the second relative position are rotationally displaced about the axis.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principals of this invention. The figures may not be drawn to scale. Like reference numbers have been used throughout the figures to denote like parts. Where modifiers such as first, second, top, bottom, etc. are used, they are for purposes of description only and not limitation.

DETAILED DESCRIPTION

Figure 1:
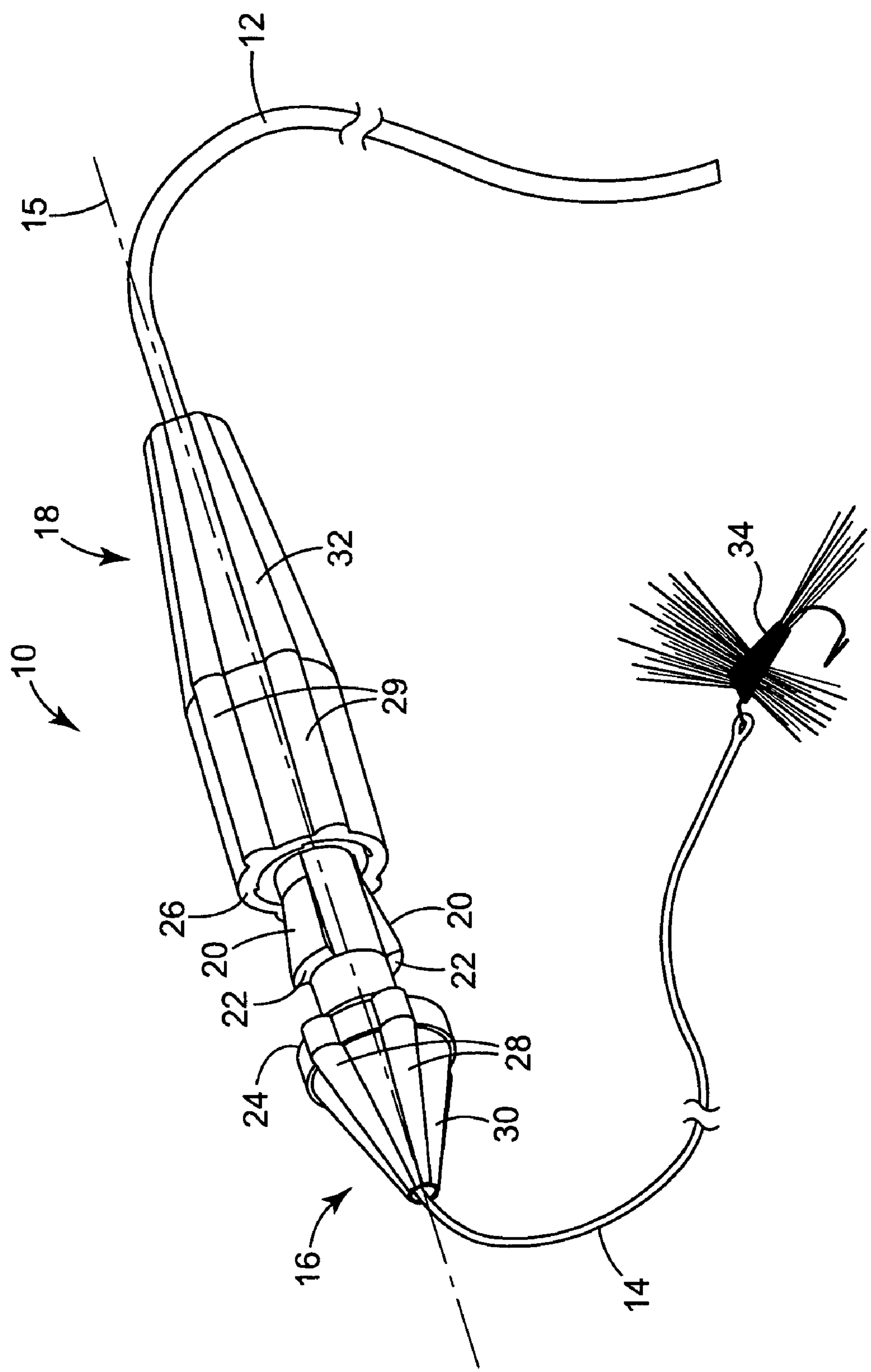
FIG. 1 is perspective view of one embodiment of the splice system of the present invention.

FIG. 1 is perspective view of one embodiment of the splice system of the present invention. Splice system 10 connects fly or fishing line 12 and leader 14 or other fishing line segments along longitudinal axis 15. Splice system 10 includes two main components: male connector or barb 16 and female connector or receiver 18.

Leader 14 is either permanently or removably secured to barb 16. Fly line 12 is either permanently or removably secured to receiver 18. FIG. 1 illustrates barb 16 partially inserted into, but not yet fully mated with, receiver 18. When barb 16 is fully inserted into receiver 18, a raised exterior feature on a first end of barb 16 engages with a raised interior feature on receiver 18 to facilitate a strong, yet reversible locking connection between barb 16 and receiver 18. In the illustrated embodiment, the raised exterior features of barb 16 include flanges 20 with radially extending shoulders 22.

In an exemplary embodiment, barb 16 has a shaped exterior surface having one or more exterior ribs 28; similarly; receiver 18 has a shaped exterior surface having one or more exterior ribs 29. When barb 16 and receiver 18 are fully connected (e.g. FIG. 5), radially extending stop surface 24 of barb 16 is disposed adjacent radially extending end surface 26 of receiver 18 and exterior ribs 28 of barb 16 align with exterior ribs 29 of receiver 18. In one embodiment, barb 16 and receiver 18 include tapered surfaces 30 and 32, respectively, to enhance the movement of splice system 10 through air and water.

When barb 16 and receiver 18 are fully connected, thereby connecting leader 14 to fly line 12, a fisherman can cast fly line 12 and leader 14 over the water to place fly 34 into the body of water. In an exemplary embodiment, barb 16 and receiver 18 are each molded from a lightweight, resilient and durable material such as plastic or nylon. Nylon 66, available from E.I. DuPont de Nemours and Co., Inc., Wilmington, Del., is used in one suitable embodiment. Polypropylene, which floats in water, is used in another suitable embodiment.

In an exemplary embodiment, a connected system 10 of barb 16 and receiver 18 is less than about 0.75 inch (19.05 mm) long and less than about 0.125 inch (3.2 mm) in diameter. In some embodiments, fly line 12 is about 0.932 inch (0.81 mm) to about 0.042 inch (1.07 mm) in diameter. In some embodiments, leader 14 is about 0.020 inch (0.51 mm) to about 0.026 inch (0.66 mm) in diameter. Splice system 10, with its low profile, small size, light weight, elongated shape and circular cross section is advantageous over other connection methods in that it is easy to use, very small, lightweight, and aero- and hydrodynamic. The shape and size allow a fly line 12 and leader 14 connected by splice system 10 to glide easily through air and water without disrupting the flow of the fishing line in casting. In particular, tapered surface 32 of receiver 18 improves the "pick up" of splice system 10 off the water and allows for more accurate casting due to the reduction of frictional resistance with respect to the water and air, compared to other splice systems.

In one embodiment, buoyancy is incorporated into barb 16 and/or receiver 18 by using buoyant materials or adding buoyant features such as dispersed hollow glass beads in the bulk material. System 10, when brightly colored, is functional as a strike indicator because it visibly signals movement of the leader and fly during a fish strike.

In some applications, a sinking line is preferred. In that case, sinking ingredients such as tungsten powder can be incorporated into barb 16 and/or receiver 18, or a sinking member (not shown) may be added. Moreover, the sinking member may be colored to render it highly visible by day or night or camouflaged, as desired. Other treatments for the components of splice system 10 include protection against ultraviolet light.

Figure 2:
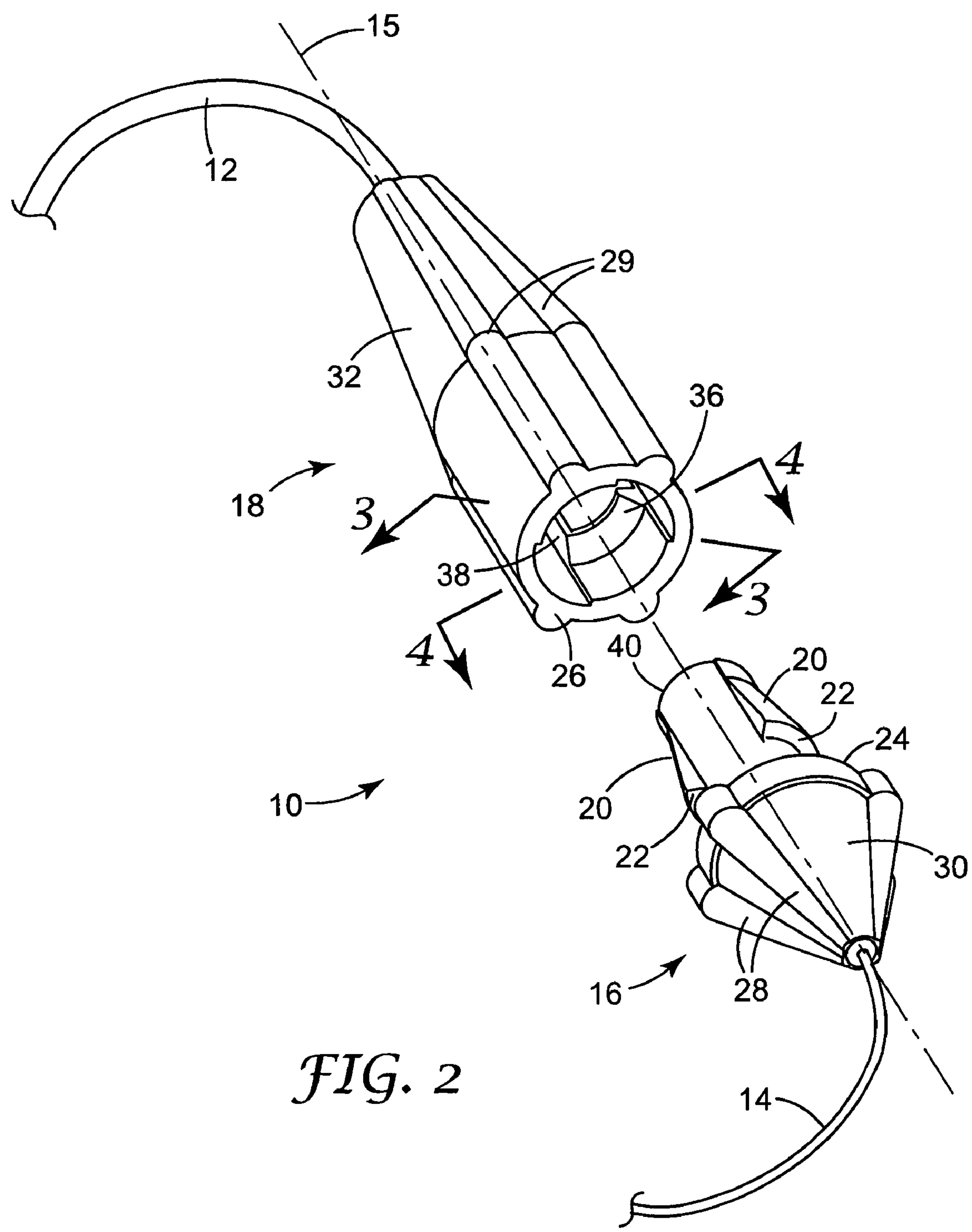
FIG. 2 is perspective view the embodiment of FIG. 1, shown from a different angle.

FIG. 2 is perspective view the embodiment of FIG. 1, shown from a different angle. In the illustrated example, barb 16 has two flanges 20 with associated radial shoulders 22. Receiver 18 has a raised interior feature, which in the illustrated example includes a ridge 36 having first and second ends and a stop rib 38 connected to one end of ridge 36. The embodiment preferably has another ridge 36 and stop rib 38 feature on an opposite interior surface of receiver 18 (not visible).

To connect barb 16 and receiver 18, a user inserts first end 40 of barb 16 past end surface 26 of receiver 18. The user rotates barb 16 and/or receiver 18 about axis 15 until flanges 20 align with interior areas of receiver 18 which are not blocked by ridges 36. The user then advances barb 16 into the opening on the receiver 18 to advance radial shoulders 22 past ridges 36. Such advance is ultimately limited by contact of extending stop surface 24 on barb 16 with end surface 26 on receiver 18. The user then rotates barb 16 relative to receiver 18 about axis 15 to position each radial shoulder 22 behind a respective ridge 36. Due to the presence of stop rib 38, this rotation step can be performed in only one direction. When a flange 20 contacts stop rib 38, further rotation is not possible; at this point, the user is assured that barb 16 and receiver 18 are adequately connected to prevent axial separation. In an exemplary embodiment, the degree of rotation required to connect system 10 can be a quarter turn or half turn, for example.

In an exemplary embodiment, barb 16 has one or more exterior ribs 28 and receiver 18 has one or more exterior ribs 29. In such an embodiment, when system 10 is fully connected, ribs 28 align with ribs 29, offering visual assurance that the locking rotation is complete. Moreover, ribs 28 and 29 provide gripping surfaces to facilitate the rotation of barb 16 and receiver 18 with respect to each other.

In the illustrated embodiment, two flanges 20 are shown, which cooperate with two ridges 36. However, it is contemplated that more or fewer such features can be used. Similarly, the exemplary embodiment has four exterior ribs 28, which align with four exterior ribs 29. However, any number of such features can be used.

Figure 3:
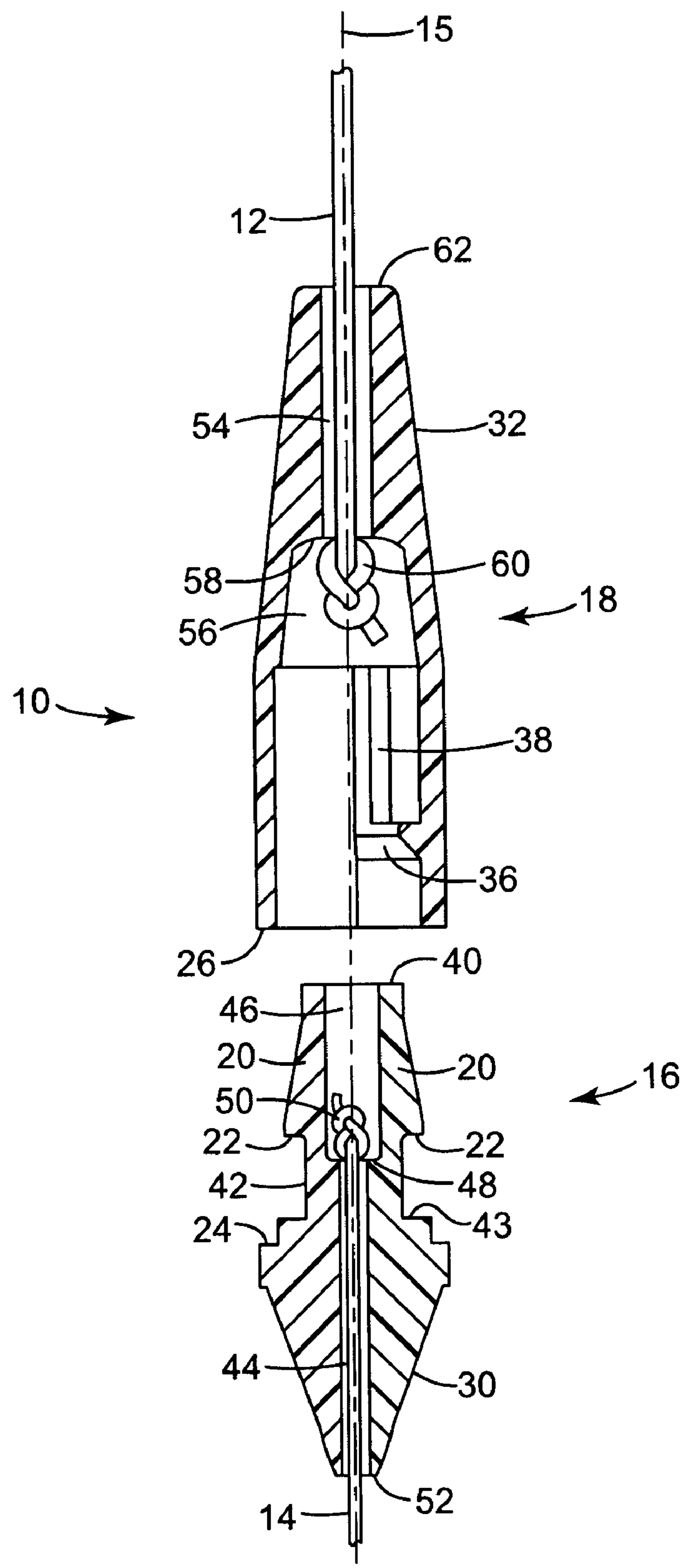
FIG. 3 is a cross-sectional view along line 3-3 of FIG. 2, showing the two connectors of the splice system in a disconnected configuration.

FIG. 3 is a cross-sectional view along line 3-3 of FIG. 2, showing the two connectors of the splice system in a disconnected configuration. In the illustrated embodiment, each flange 20 has a narrow width adjacent first end 40 of barb 16 and gradually widens to terminate at radial shoulder 22. However, it is contemplated that such a tapered shape may be replaced by a simple partial annulus or other shape. A narrow neck 42 is disposed on barb 16 between radial shoulder 22 and stop surface 24. One embodiment also includes annular step 43 to provide increased lateral stability when barb 16 and receiver 18 are connected. In one embodiment, barb 16 includes axial bore 44 and cavity 46 which intersect at interior radially extending shoulder 48. In an exemplary embodiment, axial bore 44 is large enough to allow the passage of leader 14 but not wide enough to allow the passage of knot 50 in leader 14. In an exemplary embodiment, cavity 46 is wide and deep enough to accommodate knot 50.

In the illustrated embodiment, leader 14 is removably connected to barb 16. To connect leader 14 to barb 16, a user threads leader 14 through axial bore 44 from second end 52 of barb 16 to first end 40 of barb 16. After pulling leader 14 through first end 40, the user ties the end of leader 14 into knot 50. If leader 14 is especially thin, a double knot may be used. If leader 14 extends beyond knot 50, the user can trim off the extra length if desired. Then, the user pulls back on leader 14 to seat knot 50 against shoulder 48.

In an alternative embodiment, leader 14 is attached to barb 16 during manufacturing with knot 50 or another mechanism. A filler or plug (not shown) may be inserted to close end 40 of cavity 46 during manufacture to permanently secure leader 14 in barb 16. In another embodiment, leader 14 is integrally formed with barb 16 so that axial bore 44, cavity 46 and knot 50 are eliminated. This can be accomplished, for example, by molding barb 16 over leader 14 so that they form an inseparable unit.

In the illustrated embodiment, receiver 18 includes axial bore 54 and cavity 56, which intersect at shoulder 58. Axial bore 54 is large enough to allow the passage of fly line 12 but not wide enough to allow the passage of knot 60 formed at the end of fly line 12. In one embodiment, axial bore 52 has a diameter of between about 0.030 inch (0.76 mm) and about 0.050 inch (1.27 mm). Additionally, cavity 56 is wide enough to accommodate knot 60 and deep enough to accommodate knot 60 and the portion of barb 16 from first end 40 to stop surface 24. To attach fly line 12 to receiver 18, a user threads fly line 12 from first end 62 of receiver 18 through second end 26. The user then ties knot 60 in fly line 12. If fly line 12 is especially thin, a double knot maybe used. If excess fly line 12 extends beyond knot 60, the user can trim off the extra length if desired. The user then pulls fly line 12 back in the direction of first end 62 to seat knot 60 against shoulder 58.

In the illustrated embodiment, ridge 36 has a tapered configuration. However, it is contemplated that such a tapered shape may be replaced by a simple partial annulus or other shape.

With fly line 12 thereby connected to receiver 18 and leader 14 connected to barb 16, fly line 12 and leader 14 can be connected to each other by connecting barb 16 and receiver 18, as described with reference to FIG. 2. Fly line 12 and leader 14 are beneficially aligned along axis 15 to facilitate smooth and predictable movement through air and water.

In one embodiment, barb 16 and receiver 18 include tapered surfaces 30 and 32, respectively, to enhance the movement of splice system 10 through air and water. Tapered surface 30 extends from a narrow diameter near second end 52 of barb 16 to a greater diameter toward stop surface 24. Tapered surface 32 extends from a narrow diameter near first end 62 of receiver 18 to a greater diameter toward second end surface 26.

Figure 4:
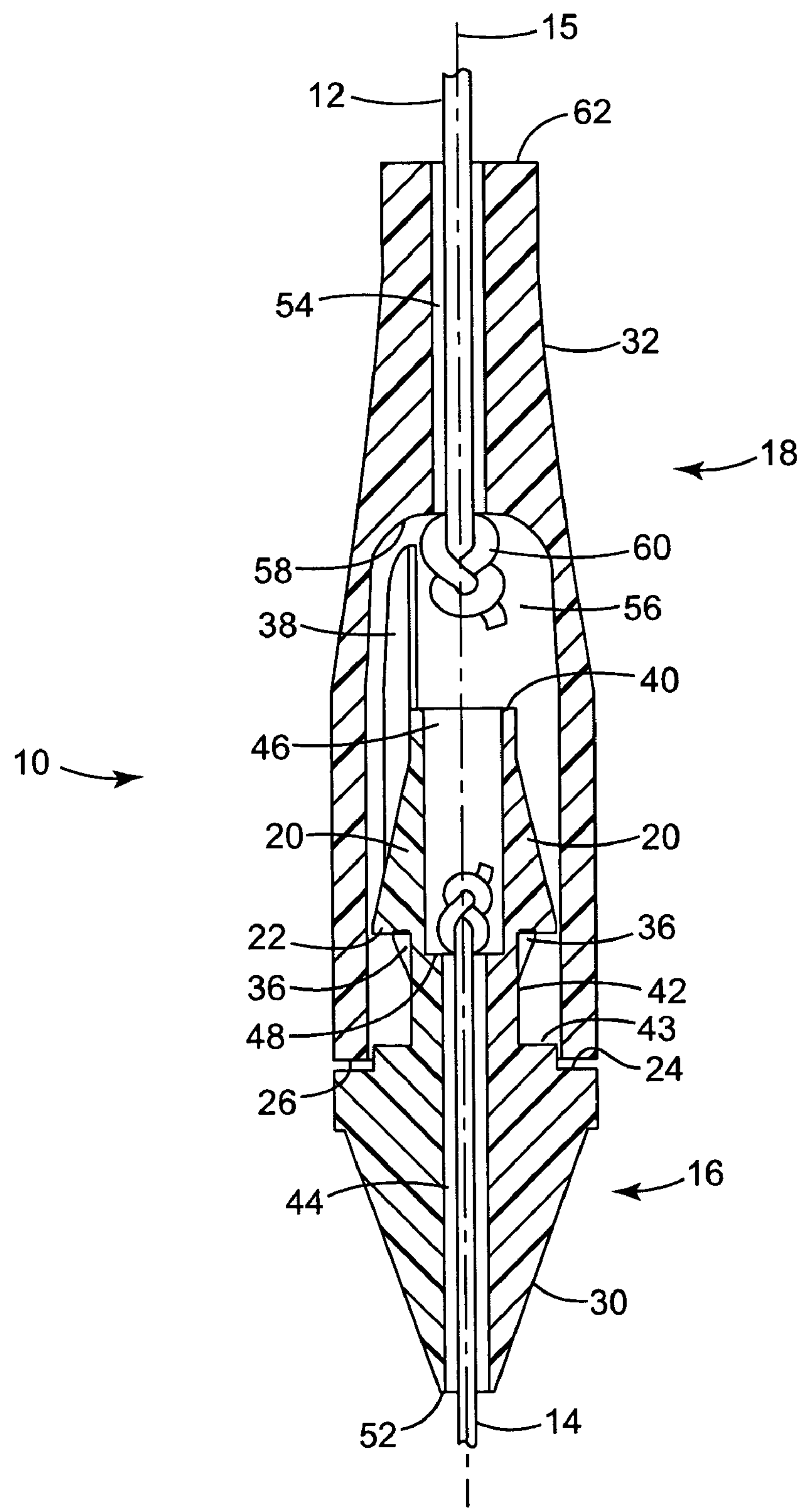
FIG. 4 is a cross-sectional view along line 4-4 of FIG. 2, showing the two connectors rotated for insertion of the male connector into the female connector.

FIG. 4 is a cross-sectional view along line 4-4 of FIG. 2, showing the two connectors rotated for insertion of the male connector into the female connector. To connect barb 16 and receiver 18, a user inserts first end 40 of barb 16 past end surface 26 of receiver 18. To insert barb 16 completely into receiver 18, the connectors are rotated with respect to each other about axis 15 so that flanges 20 align with interior areas of receiver 18 which are not blocked by ridges 36. The user then advances radial shoulders 22 past ridges 36 (as shown in FIG. 4). This is a first relative position of barb 16 and receiver 18, wherein flanges 20 are not engaged with ridges 36.

Figure 5:
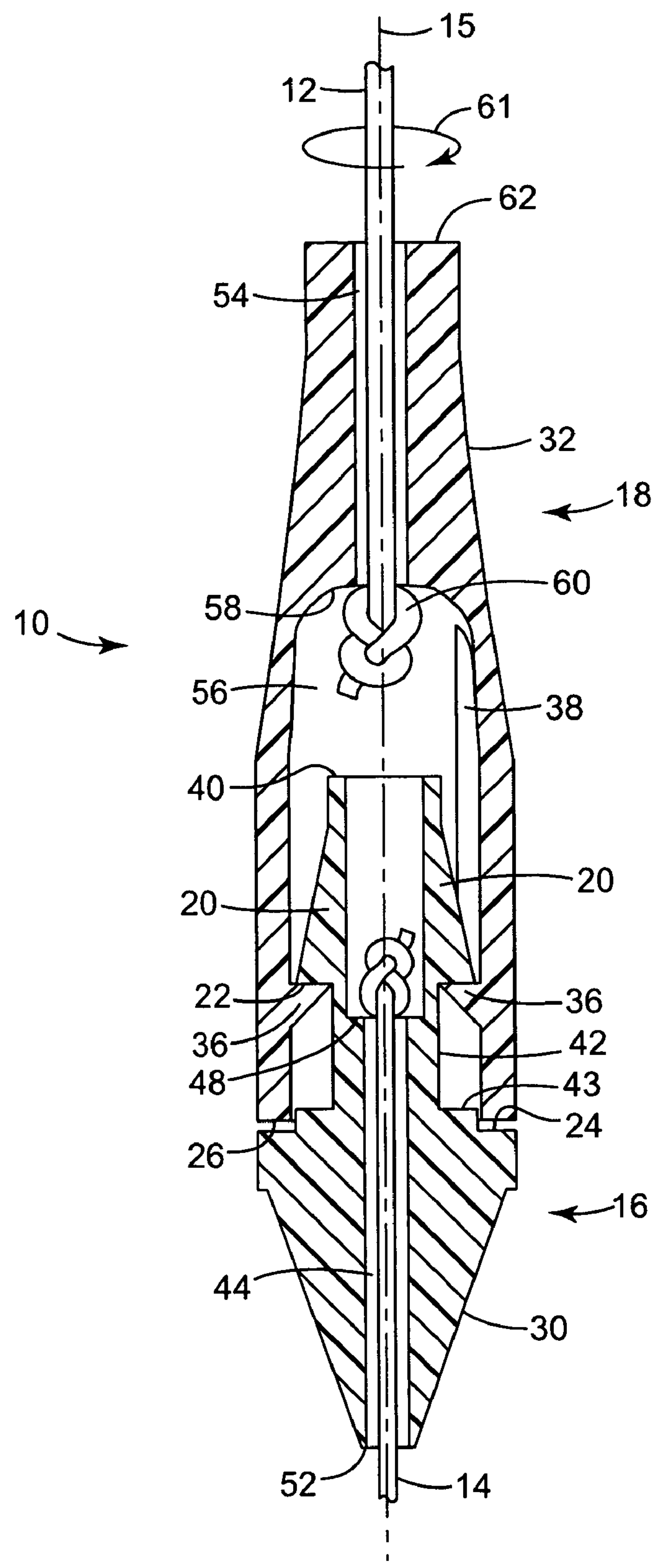
FIG. 5 is a cross-sectional view of the two connectors of FIG. 4, rotated for connection of the male connector and the female connector.

FIG. 5 is a cross-sectional view of the two connectors of FIG. 4, rotated for connection of the male connector and the female connector. Once barb 16 is fully inserted into receiver 18, as shown in FIG. 4, receiver 18 is rotated relative to barb 16 about axis 15 in the direction shown by arrow 61 to achieve the configuration shown in FIG. 5. This is a second relative position of barb 16 and receiver 18, wherein flanges 20 are engaged with ridges 36. In an alternative embodiment, barb 16 can be rotated with respect to receiver 18 in the opposite direction. The relative rotation direction between barb 16 and receiver 18 is set by the location of stop rib 38, which may be positioned on the opposite side of ridge 36 in an alternative embodiment, thereby requiring a reverse rotation direction for engagement.

Once the rotation step is complete, a flange 20 contacts stop rib 38, and further rotation is prevented. At this point, each radial shoulder 22 is locked above a respective ridge 36. An advantage of this invention is that the locking step is reversible. By reversing the rotation step and insertion steps, barb 16 and receiver 18 can be separated. This is particularly desirable because a user can then connect a different barb 16 to the receiver 18 or a different receiver 18 to the barb 16 without having to discard either section and without having to tie complicated connection knots. Thus, fly lines 12 and leaders 14 may be interchanged and preserved for later use. Moreover, system 10 is not limited to the connection of fly line 12 to leader 14, but can be used to connect pairs of any types of lines.

In one exemplary embodiment, an interference fit exits between barb 16 at radial shoulder 22 and interior surface of receiver 18 to provided added strength to the connection of system 10. In an exemplary embodiment, barb 16 at first end 40 has an outside diameter of about 0.090 inch (2.29 mm); barb 16, measured across opposed radial shoulders 22 has an outside diameter of about 0.120 inch (3.05 mm); and bore 56 has a largest unexpanded inner diameter of about 0.106 inch (2.69 mm). This interference fit prevents unintended rotation of barb 16 and receiver 18 relative to one another, thus ensuring that they stay coupled together in use.

In an exemplary embodiment, the materials and dimensions of barb 16 and receiver 18 are chosen so that barb 16 and receiver 18 cannot be separated with manual tensile or separation force along axis 15 of at least about 8 pounds (3.6 kg), absent a reverse rotation of the connectors, as discussed above. In an especially suitable embodiment, barb 16 and receiver 18 cannot be separated with tensile or separation force along axis 15 of at least about 10 pounds (4.5 kg). Nylon is an especially suitable material for barb 16 and receiver 18 because it swells slightly in water, leading to an even stronger interference connection between barb 16 and receiver 18.

Figure 6:
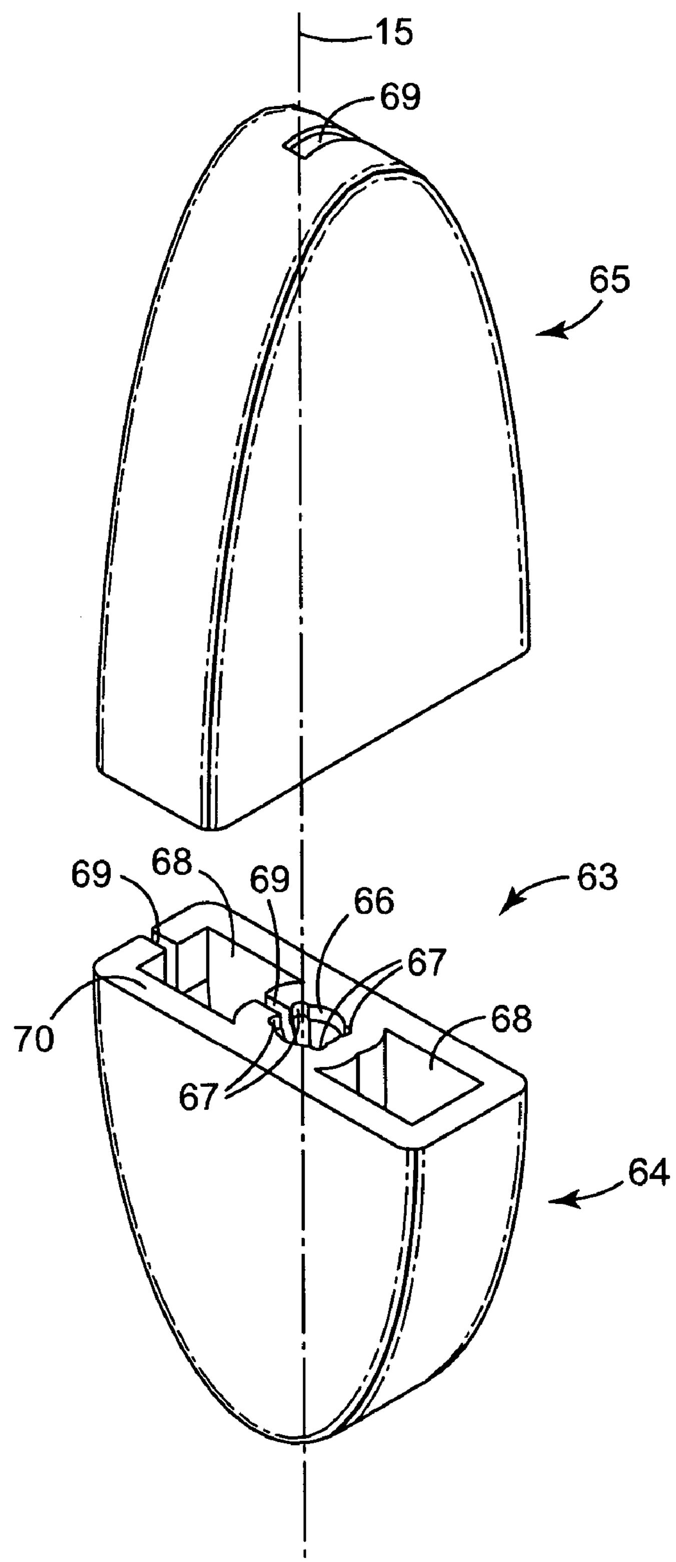
FIG. 6 is perspective view of one embodiment of a tool of the present invention for use in facilitating the rotation and connection of the male and female connectors in a first embodiment of a connection method.

FIG. 6 is perspective view of one embodiment of a tool of the present invention for use in facilitating the rotation and connection of the male and female connectors in a first embodiment of a connection method. Because barb 16 and receiver 18 are each very small, the present invention provides for exemplary tools to aid in their connection and disconnection. Tool 63 includes barb holder 64 and receiver holder 65. Each holder 64, 65 includes shaped orifice 66 to hold either barb 16 or receiver 18. In an exemplary embodiment, orifice 66 includes one or more rib-shaped perimeter cut-outs 67 to mate with any exterior ribs 28, 29, thereby providing for a secure, non-rotating hold between the holder 64, 65 and the respective connector 16, 18. An exemplary embodiment includes hollow areas 68 between walls 70 for savings in materials, cost, and weight. The illustrated embodiment includes slot 69, through which fly line 12 or leader 14 is inserted.

Tool 63 is used as follows in an exemplary connection method. Barb 16 is inserted into orifice 66 so that exterior ribs 28 nestle into corresponding orifices 66; leader 14 is strung through slot 69 so that it hangs from a bottom of barb tool 64. The structure of receiver tool 65 is very similar to that of barb tool 64. Receiver 18 is inserted into orifice 66 (not visible) of receiver tool 65 so that exterior ribs 29 nestle into corresponding orifices 66; fly line 12 is strung through slot 69 so that it hangs from a top of receiver tool 65.

The user can then grasp the relatively large tools 64, 65 to achieve the rotation motions required for the connection and disconnection of system 10 about axis 15, as described with respect to FIGS. 2-5. In an exemplary embodiment, barb tool 64 is about 1.0 inch (25.4 mm) wide, about 0.375 inch (9.5 mm) thick, and about 1.0 inch (25.4 mm) long, with a wall thickness of about 0.08 inch (2.0 mm). In an exemplary embodiment, receiver tool 65 is about 1.0 inch (25.4 mm) wide, about 0.375 inch (9.5 mm) thick, and about 1.5 inch (38.1 mm) long, with a wall thickness of about 0.08 inch (2.0 mm). In an alternative embodiment, tool 63 may take the form of any device having shaped orifice 66.

Figure 7:
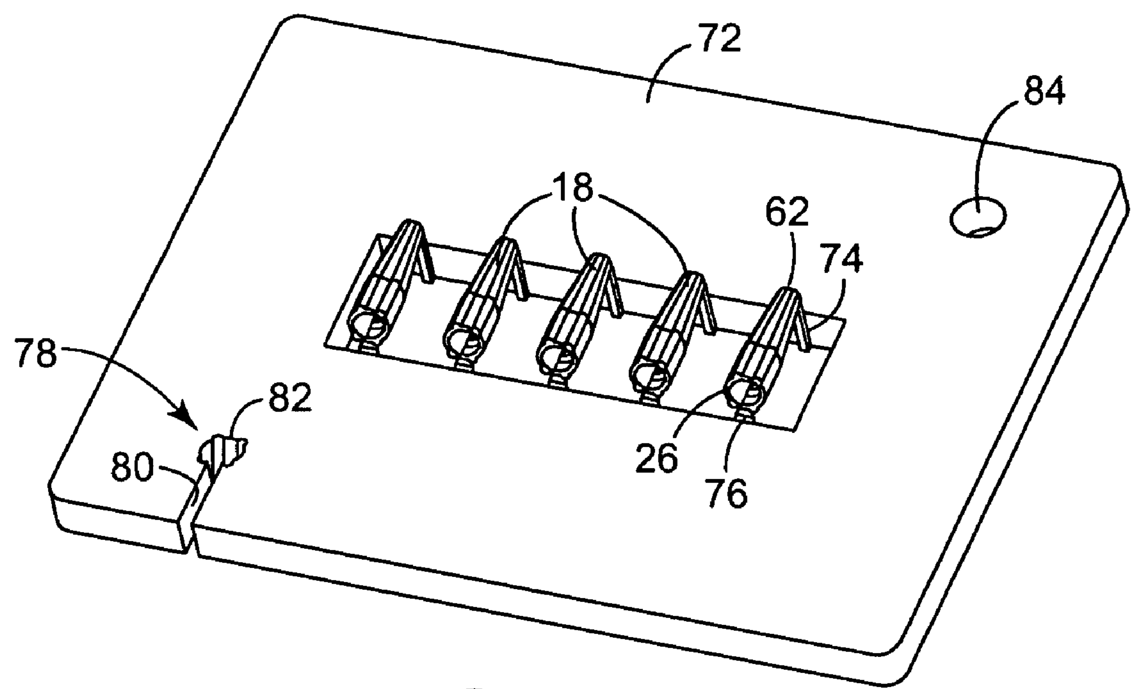
FIG. 7 is a perspective view of a card holding multiple female connectors.

FIG. 7 is a perspective view of a card holding a multiple female connectors 18. Card 72 provides for convenient storage of, and easy accessibility to, receivers 18. Card 72 is easily stored in a user's vest pocket, providing a convenient storage unit for receivers 18, which might otherwise be easily lost because of their small size. An added convenience is that a user can thread fly line 12 through receiver 18 and tie knot 60 while the receiver 18 is held on card 72, thus reducing the risk of dropping and losing the receiver 18 while tying on fly line 12. In one embodiment, receivers 18 are integrally molded with card 72, leaving connecting members 74 and 76 at end 62 and end 26 of each receiver 18, respectively. In one embodiment, each connecting member 74 and 76 secures the respective receiver 18 to card 72 during routine handling, but is easily broken with manual force for the removal of a receiver 18 from card 72.

In one embodiment, card 72 includes tool 78 to facilitate the connection of barb 16 and receiver 18. Tool 78 includes slot 80 and a slot terminus. In the illustrated embodiment, the slot terminus is a shaped orifice 82, similar to shaped orifice 66 of FIG. 6. In one embodiment, card 72 includes orifice 84 as an attachment means to allow a user to secure card 72 to the user's clothing, for example. In an exemplary embodiment, card 72 is about 3-⅜ inches (85.7 mm) long, about 2-½ inches (63.5 mm) wide and has a thickness of about ⅛ inch (3.2 mm). While five receivers 18 are illustrated, it is contemplated that more or fewer may be provided on a single card 72.

Figure 8:
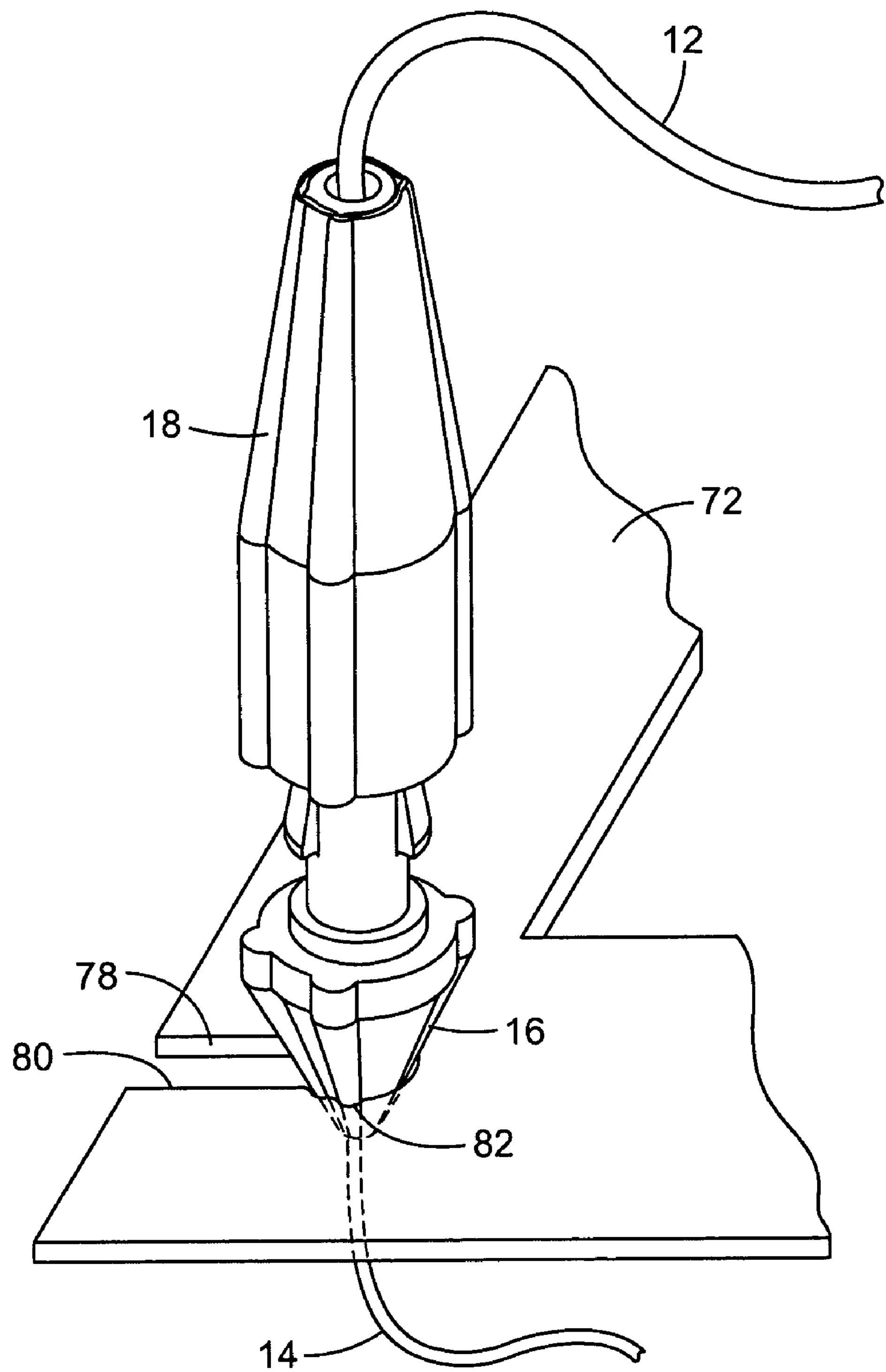
FIG. 8 is a partial perspective view illustrating use of a connector holding tool disposed on the card of FIG. 7 in a second embodiment of a connection method.

FIG. 8 is a partial perspective view illustrating use of connector holding tool disposed 78 on card 72 in a second embodiment of a connection method. In one method of use, a user slides leader 14 through slot 80 to orifice 82 so that barb 16 rests in orifice 82. The shape of orifice 82 closely mates with the exterior shape of barb 16 to prevent rotation of barb 16 within orifice 82. With barb 16 thus held, the user can then attach receiver 18. The use of receiver holder 65 (FIG. 6) is especially helpful because of the difficulty of handling the very small receiver 18. In an exemplary embodiment, orifice 82 has a diameter of about 0.116 inch (2.95 mm) and slot 80 has a width of about 0.053 inch (1.35 mm).

Figure 9:
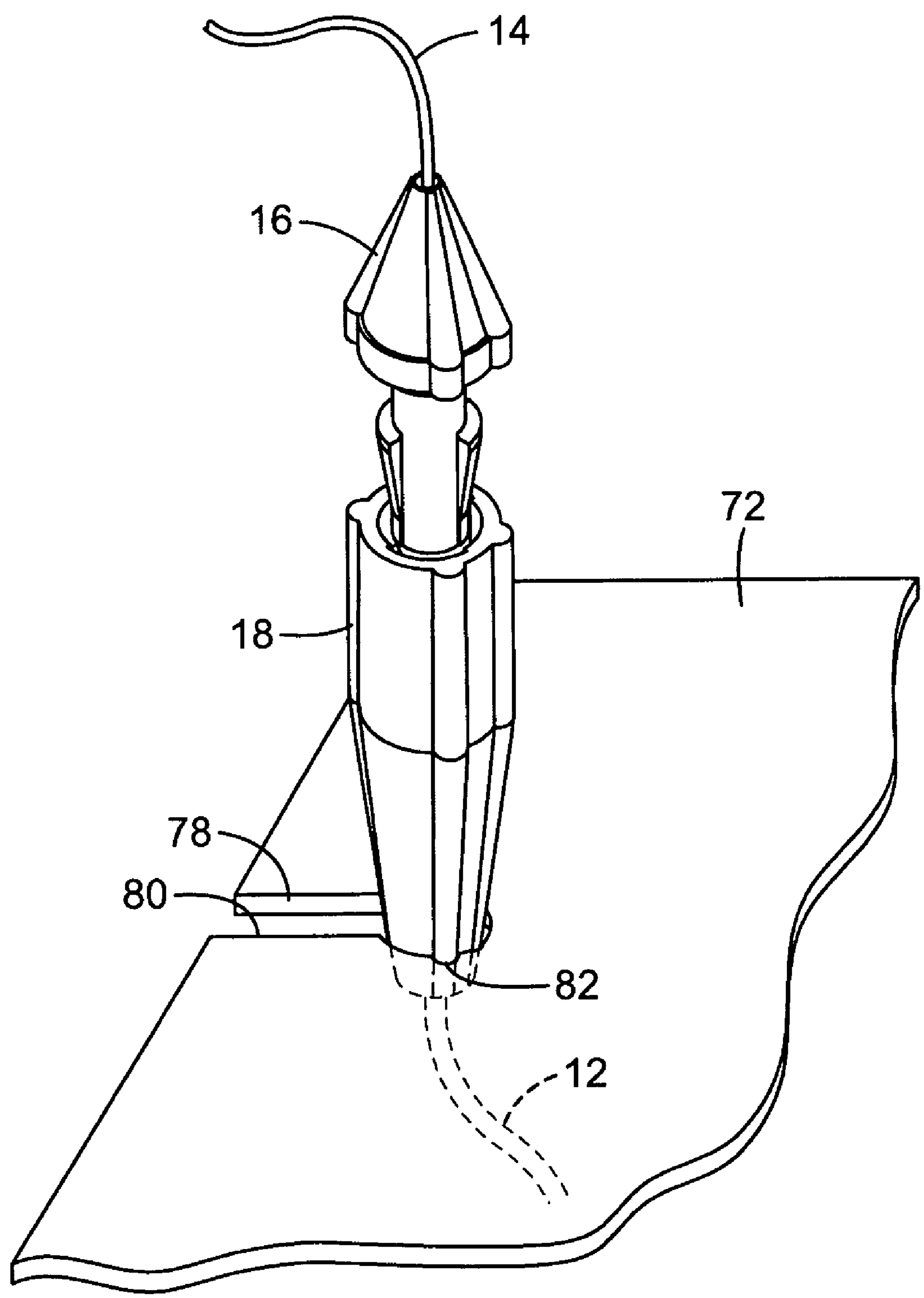
FIG. 9 is a partial perspective view illustrating use of a connector holding tool disposed on the card of FIG. 7 in a third embodiment of a connection method.

FIG. 9 is a partial perspective view illustrating use of a connector holding tool disposed on the card of FIG. 7 in a third embodiment of a connection method. In the method illustrated in FIG. 9, receiver 18 is inserted into orifice 82 of tool 78. In this embodiment, tool 78 of card 72 holds receiver 18 to facilitate the insertion of barb 16 into receiver 18. The shape of orifice 82 closely mates with the exterior shape of receiver 18 to prevent rotation of receiver 18 within orifice 82. With receiver 18 thus held, the user can then attach barb 16. The use of barb holder 64 (FIG. 6) is especially helpful because of the difficulty of handling the very small barb 16.

Although the present invention has been described with reference to preferred embodiments, workers skilled in the art will recognize that changes may be made in form and detail without departing from the spirit and scope of the invention. For example, while a flange and ridge connection is illustrated, it is also contemplated that the invention can use other types of releasable connections. For example, a threaded or other type of connection using a rotary motion to connect the barb and receiver may be used.

The invention claimed is:

1. A splice system for linear connection of fishing lines, the system comprising:

a female connector having first and second opposite ends and a longitudinal axis, the first end configured to be removably connected to a first fishing line section to be used in a fishing application and the second end having a first opening therein, the female connector having a raised interior feature, the female connector having an exterior surface with non-circular cross section; and a male connector having first and second opposite ends and a longitudinal axis, the second end of the male connector configured to be removably connected to a second fishing line section to be used in a fishing application and the first end configured for coaxial insertion into the first opening of the female connector, the first end of the male connector having a raised exterior feature, the male connector having an exterior surface with non-circular cross section;

wherein the female connector and the male connector have a first relative position representing a disengaged state, wherein the raised interior feature of the female connector is not engaged with the raised exterior feature of the male connector;

wherein the female connector and the male connector have a second relative position representing an engaged state which defines a longitudinal axis of the system, wherein the raised interior feature of the female connector is engaged with the raised exterior feature of the male connector; and wherein the first relative position and the second relative position are rotationally displaced about the longitudinal axis of the system.

2. The splice system of claim 1 further comprising:

an axial bore in the first end of the female connector having a diameter greater than a diameter of an end of the first fishing line section and less than a diameter of a knot formed at the end of the first fishing line section.

3. The splice system of claim 1 wherein the raised exterior feature of the male connector has a first end at the first end of the male connector and an opposite second end and wherein the raised exterior feature tapers from a smaller dimension at the first end of the raised exterior feature to a larger dimension at the second end of the raised exterior feature.

4. The splice system of claim 3 further comprising a neck on the male connector adjacent the second end of the raised exterior feature, a surface between the neck and the second end of the raised exterior feature forming a radial shoulder.

5. The splice system of claim 1 wherein the raised interior feature of the female connector is a ridge having a first end and a second end.

6. The splice system of claim 5 further comprising a tapered surface disposed on the ridge, the tapered surface facing the second end of the female connector.

7. The splice system of claim 5 further comprising a radially extending flat surface disposed on the ridge, the flat surface facing the first end of the female connector.

8. The splice system of claim 5 further comprising:

a stop rib connected to one of the first and second ends of the ridge.

9. The splice system of claim 1 further comprising a radially extending stop surface disposed on the male connector which faces the second end of the female connector when the male connector and the female connector are disposed in the second relative position.

10. The splice system of claim 9 wherein the male connector tapers from a larger dimension adjacent the stop surface to a smaller dimension at the second end of the male connector.

11. The splice system of claim 1 further comprising:

a first exterior rib disposed on the female connector; and a second exterior rib disposed on the male connector;

wherein the first exterior rib and the second exterior rib are aligned when the female connector and the male connector are disposed in the second relative position.

12. The splice system of claim 1 further comprising:

a tool having a shaped orifice, a shape of the orifice corresponding to the exterior surface of either the female or the male connector to prevent relative rotation between the tool and the respective connector upon insertion of the respective connector into the orifice.

13. The splice system of claim 12 wherein the tool further comprises:

a slot in communication with the orifice for allowing passage of the respective fishing line section connected to the respective connector.

14. A splice system for linear connection of fishing lines, the system comprising:

a lightweight female connector having first and second opposite ends and a longitudinal axis, the first end having an axial bore to accept a first fishing line section, the axial bore having a diameter greater than a diameter of an end of the first fishing line section and less than a diameter of a knot formed at the end of the first fishing line section, and the second end having a first opening therein, the female connector having a raised interior feature, the female connector having an exterior surface with non-circular cross section; and a lightweight male connector having first and second opposite ends and a longitudinal axis, the second end of the male connector having an axial bore to accept a second fishing line section, the axial bore having a diameter greater than a diameter of an end of the second fishing line section and less than a diameter of a knot formed at the end of the second fishing line section, and the first end of the male connector configured for coaxial insertion into the first opening of the female connector, the first end having a raised exterior feature, the male connector having an exterior surface with non-circular cross section;

wherein the female connector and the male connector have a first relative position representing a disengaged state, wherein the raised interior feature of the female connector is not engaged with the raised exterior feature of the male connector;

wherein the female connector and the male connector have a second relative position representing an engaged state which defines a longitudinal axis of the system, wherein the raised interior feature of the female connector is engaged with the raised exterior feature of the male connector; and wherein the first relative position and the second relative position are rotationally displaced about the longitudinal axis of the system.

15. The splice system of claim 14 wherein the raised exterior feature of the male connector has a first end at the first end of the male connector and an opposite second end and wherein the raised exterior feature tapers from a smaller dimension at the first end of the raised exterior feature to a larger dimension at the second end of the raised exterior feature.

16. The splice system of claim 15 further comprising a neck on the male connector adjacent the second end of the raised exterior feature, a surface between the neck and the second end of the raised exterior feature forming a radial shoulder.

17. The splice system of claim 14 wherein the raised interior feature of the female connector is a ridge having a first end and a second end.

18. The splice system of claim 17 further comprising a tapered surface disposed on the ridge, the tapered surface facing the second end of the female connector.

19. The splice system of claim 17 further comprising a radially extending flat surface disposed on the ridge, the flat surface facing the first end of the female connector.

20. The splice system of claim 14 further comprising a radially extending stop surface disposed on the male connector which faces the second end of the female connector when the male connector and the female connector are disposed in the second relative position.

* * * * *

UNITED STATES PATENT AND TRADEMARK OFFICE

CERTIFICATE OF CORRECTION

PATENT NO. : 7,861,457 B2
APPLICATION NO. : 10/941284
DATED : January 4, 2011
INVENTOR(S) : Russell E Blette It is certified that error appears in the above-identified patent and that said Letters Patent is hereby corrected as shown below:

Title page,
Item [60], Related U.S. Application Data is missing, please add the following:

Priority to application No. 10/628220, filed on Jul. 28, 2003.

Item [56], References Cited, under U.S. Patent Documents, please add the following references that were considered by the examiner but do not appear on the printed patent:

| | | |
|---|---|---|
| 6,880,289 | 04-19-2005 | Yin |
| 2005/0022441 | 02-03-2005 | Blette et al. |

Under Foreign Patent Documents, please add the following reference that was considered by the examiner but does not appear on the printed patent:

WO 91/05963 05-02-1991

In the Specification:

Column 5,
Line 9; Delete “maybe” and insert -- may be --, therefor.

Column 5-6,
Line 67 to 1; Delete “Morever” and insert -- Moreover --, therefor.

Column 6,
Line 64; After “holding” delete “a”.

Signed and Sealed this
Thirtieth Day of April, 2013

Teresa Stanek Rea
*Acting Director of the United States Patent and Trademark Office*